United States Patent
Haase (10) Patent No.: US 11,145,878 B2
(45) Date of Patent: Oct. 12, 2021

(54) FLOW FIELD OF A FUEL CELL

(71) Applicant: Bayerische Motoren Werke Aktiengesellschaft, Munich (DE)

(72) Inventor: Stefan Haase, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 292 days.

(21) Appl. No.: 15/818,916

(22) Filed: Nov. 21, 2017

(65) Prior Publication Data

US 2018/0076469 A1    Mar. 15, 2018

Related U.S. Application Data

(63) Continuation of application No. PCT/EP2016/059591, filed on Apr. 29, 2016.

(30) Foreign Application Priority Data

Jun. 26, 2015   (DE) ...................... 10 2015 211 893.2

(51) Int. Cl.
*H01M 8/0263*    (2016.01)
*H01M 8/04082*   (2016.01)
(Continued)

(52) U.S. Cl.
CPC ....... *H01M 8/0263* (2013.01); *H01M 8/0265* (2013.01); *H01M 8/04201* (2013.01);
(Continued)

(58) Field of Classification Search
CPC .. H01M 8/026; H01M 8/0263; H01M 8/0265; H01M 8/1004; H01M 8/1007; H01M 8/04201; H01M 2008/1095
See application file for complete search history.

(56) References Cited

U.S. PATENT DOCUMENTS

| | | | |
|---|---|---|---|
| 7,459,227 B2 * | 12/2008 | Rock ................... | H01M 8/0258 429/457 |
| 2001/0041281 A1 * | 11/2001 | Wilkinson .......... | H01M 8/0258 429/480 |

(Continued)

FOREIGN PATENT DOCUMENTS

| | | |
|---|---|---|
| CN | 101267042 A | 9/2008 |
| CN | 101366130 A | 2/2009 |

(Continued)

OTHER PUBLICATIONS

German Search Report issued in counterpart German Application No. 10 2015 211 893.2 dated Mar. 2, 2016 with partial English-language translation (Eleven (11) pages).

(Continued)

*Primary Examiner* — Muhammad S Siddiquee
(74) *Attorney, Agent, or Firm* — Crowell & Moring LLP (57) ABSTRACT

A fuel cell having an ion-selective separator, a gas diffusion layer and a separator plate, is provided. The separator plate forms, together with the gas diffusion layer, at least one gas-conducting flow field. At least one convergent duct section and at least one divergent duct section are formed in the flow field, wherein the convergent duct section lies adjacent to the divergent duct section. A barrier is provided between the convergent duct section and the divergent duct section such that the gas flows at least partially through the gas diffusion layer in order to pass directly from the convergent duct section into the divergent duct section. At least one additional convergent duct section, at least one additional divergent duct section and at least one additional barrier are provided downstream of the convergent duct section and/or downstream of the divergent duct section.

20 Claims, 4 Drawing Sheets

(51) Int. Cl.
  *H01M 8/1004* (2016.01)
  *H01M 8/0265* (2016.01)
  *H01M 8/1007* (2016.01)
  *H01M 8/1018* (2016.01)

(52) U.S. Cl.
  CPC ....... *H01M 8/1004* (2013.01); *H01M 8/1007* (2016.02); *H01M 2008/1095* (2013.01)

(56) References Cited

U.S. PATENT DOCUMENTS

| | | |
|---|---|---|
| 2006/0054221 A1 | 3/2006 | Steidle et al. |
| 2007/0105000 A1* | 5/2007 | Chapman ............ H01M 8/0258 429/430 |
| 2007/0178359 A1 | 8/2007 | Peng et al. |
| 2008/0226967 A1 | 9/2008 | Tighe et al. |
| 2008/0292938 A1 | 11/2008 | Perry et al. |
| 2018/0175406 A1* | 6/2018 | Kong .................. H01M 8/2483 |

FOREIGN PATENT DOCUMENTS

| | | |
|---|---|---|
| CN | 100536203 C | 9/2009 |
| DE | 100 38 589 A1 | 2/2002 |
| DE | 10 2005 037 093 A1 | 2/2007 |
| DE | 10 2008 013 439 A1 | 10/2008 |
| DE | 10 2008 033 210 A1 | 1/2010 |
| DE | 10 2012 221 802 A1 | 5/2014 |
| JP | 2007-141556 A | 6/2007 |

OTHER PUBLICATIONS

International Search Report (PCT/ISA/210) issued in PCT Application No. PCT/EP2016/059591 dated Jun. 30, 2016 with English-language translation (Seven (7) pages).
German-language Written Opinion (PCT/ISA/237) issued in PCT Application No. PCT/EP/2016/059591 dated Jun. 30, 2016 (Eleven (11) pages).
Notification under Article 94 (3) EPO issued in counterpart European Application No. 16719403.4 dated Apr. 1, 2019 (12 pages).
Chinese-language Office Action issued in Chinese Application No. 201680027563.7 dated Jul. 10, 2020 with English translation (15 pages).
Chinese-language Office Action issued in Chinese Application No. 201680027563.7 dated Mar. 18, 2020 with English translation (17 pages).

* cited by examiner

FLOW FIELD OF A FUEL CELL

CROSS REFERENCE TO RELATED APPLICATIONS

This application is a continuation of PCT International Application No. PCT/EP2016/059591, filed Apr. 29, 2016, which claims priority under 35 U.S.C. § 119 from German Patent Application No. 10 2015 211 893.2, filed Jun. 26, 2015, the entire disclosures of which are herein expressly incorporated by reference.

BACKGROUND AND SUMMARY OF THE INVENTION

The technology disclosed here pertains to a flow field of a fuel cell.

The flow field of a fuel cell is formed by the separator plate contour. The fuel, usually hydrogen, and the oxidizing agent, usually air, are located at the side of the separator plate. Moreover, a cooling may be provided with a coolant $K_{ue}$ in the separator plate. The goal is an equal distribution of the media (reaction gases, coolant) over the entire active surface. Here, duct structures are usually formed for all three media. The flow fields are usually formed by straight ducts with the same continuous width.

DE 100 385 89 A1 discloses a fuel cell with a polymer electrolyte membrane on which gas diffusion electrodes are arranged on both sides, which electrodes are covered by a bipolar plate. The bipolar plate is provided with a network of gas supply ducts and gas exhaust ducts, which are bounded by the gas diffusion electrode and separated from each other. Thus, the supplied gas must migrate through the gas diffusion electrode in order to get from the supply duct system to the exhaust duct system.

DE 10 2012 221 802 A1 discloses a fuel cell with an anode and cathode stack, including at least one gas diffusion layer and a plurality of adjacent fluid inlet ducts. At least one of the fluid inlet ducts is designed with a flow resistance increasing in the basic flow direction S of the fluid flowing therein, which resistance is formed by a diminishing flow cross-section area.

Also, in these embodiments, the fluid flowing in the duct is not optimally utilized. In particular, when larger flow fields are present, a more irregular chemical reaction occurs, since the gases are not distributed uniformly or not in a uniform concentration over the flow field. With a dead-end duct configuration as is shown, for example, in FIG. 3 of DE 100 385 89 A1, although it is ensured that the medium does in fact flow through the gas diffusion layer, the flow rate may vary over the length of the flow field, i.e., the longitudinal axis of the duct. Moreover, relatively high pressures may occur, which might then require larger compressors. If there is a blockage upstream from the dead end in a dead end configuration, comparatively less gas can flow from the region between the dead end and the blockage through the gas diffusion layer. Moreover, a comparatively small pressure gradient is formed between the duct region immediately prior to the blockage and the duct region immediately after it. Thus, the blockage is only slightly sucked out from the duct. Moreover, the blockage cannot pass across the gas diffusion layer, or can do so only slightly. Thus, iron deposits cannot be removed efficiently from the flow field, which may have a negative impact on the cold starting behavior. In order to deal with the risk of blockage, the ducts themselves can have a larger width. However, this has a negative effect on the structural volume. If the structural volume is supposed to remain the same, the webs forming the ducts must be narrower. This, in turn, would mean a smaller contact surface for the gas diffusion layer, which would then, in turn, impact the voltage losses between the gas diffusion layer and the separator plate.

The gas crossing over from an inlet duct into an outlet duct already undergoes a reaction upon crossing the gas diffusion layer. Consequently, gas accumulates in the outlet duct with a lower concentration of oxidizing agent O or fuel B. In the outlet duct, the concentration of oxidizing agent O or fuel B is therefore lower than in the inlet duct. Hence, the extent of the chemical reaction of the gases in the outlet duct with the adjoining ion-permeable separator is also therefore less than the extent of the chemical reaction of the gases in the inlet duct. The medium passing through the gas diffusion layer accumulates in the outlet duct in layers which are formed adjacent to the separator plate. Therefore, it is these layers that have a small concentration of oxidizing agent O or fuel B. The layers spaced apart from the separator plate, such as the layer near the bottom of the duct, do not reach the separator plate or do so only to a reduced extent. These spaced-apart layers, however, under certain circumstances may have a higher concentration of oxidizing agent O or fuel B than the neighboring layers.

The previously known solutions are furthermore poorly suited to large fuel cells. Here, because of the duct geometry, comparatively more space is needed.

Comparatively large cross-section areas need to be provided. However, on account of elastic deformations, a contact with the gas diffusion layer cannot always be assured.

DE 10 2008 013 439 A1 discloses a flow field in which the flow ducts are each divided into subducts at branching points and then run together once more. A mixing of the gas flow occurs only across webs. Here as well, a relatively slight distribution of the gas of one duct among the other ducts is established.

One problem which the technology disclosed here proposes to solve is to lessen or eliminate the drawbacks of the previously known solutions. In particular, one goal of the technology disclosed here is to conduct the gases crossing the flow field to the ion-permeable separator so that the oxidizing agent O or the fuel B can be better utilized for the chemical reaction. Moreover, another goal of the technology disclosed here is to lessen the effects of blockages or to prevent blockages. This and other objectives are achieved in accordance with embodiments of the invention.

The technology disclosed here concerns a fuel cell system with at least one fuel cell. The fuel cell system is intended, for example, for mobile applications such as motor vehicles. In its simplest form, a fuel cell is an electrochemical energy transformer, which transforms fuel B and oxidizing agent O into reaction products, and thereby produces electricity and heat. In relation to the technology disclosed here, the term "gas" means, in general, the oxidizing agent O and the fuel B of the fuel cell. The fuel cell disclosed here includes an anode with an anode space and a cathode with a cathode space, which are separated by an ion-selective separator. The anode has a supply of a fuel to the anode. Preferred fuels are, for example, hydrogen, low-molecular alcohol, biofuels, or liquefied natural gas. The cathode has, for example, a supply of oxidizing agent. Preferred oxidizing agents are, e.g., air, oxygen and peroxides. A fuel cell system includes at least one fuel cell as well as peripheral system components (BOP components), which may be employed during the operation of the at least one fuel cell. Generally, several fuel cells are assembled into a fuel cell stack.

The fuel cell disclosed here includes an ion-selective separator. The ion-selective separator can be designed, e.g., as a proton exchange membrane (PEM). Preferably, a cation-selective polymer electrolyte membrane is used. Materials for such a membrane are, for example: Nafion®, Flemion® and Aciplex®. Moreover, other layers may be provided at the proton exchange membrane, such as a catalyst layer. The fuel cell includes a gas diffusion layer (also called the GDL below), situated adjacent to the separator. This may be, for example, a layer of thin, porous carbon paper or fabric. The ion-selective separator and the GDL are familiar to one of ordinary skill in the art.

The fuel cell includes moreover at least one separator plate which, together with the gas diffusion layer, forms at least one gas-conducting flow field. Preferably, the separator plate can be a bipolar plate. Preferably, two separator plates, one on either side of the ion-permeable separator, form a fuel cell together with the ion-permeable separator. The bipolar plate may have a liquid-cooled design. However, other cooling techniques are also contemplated.

The flow field, especially the duct sections and mixing zones disclosed here, is formed by the regions of the separator plate which are spaced apart by the GDL and lie against those surfaces of the ion-permeable separator where the electrochemical reaction occurs on either side of the separator. The flow field is expediently arranged such that the gas transported in the flow field can pass directly from the flow field into the gas diffusion layer. Thus, the gas diffusion layer separates the flow field from the ion-selective separator. In this regard, a predistributing duct structure, not arranged on the active surfaces of the ion-permeable separator where the electrochemical reactions occur, should not be regarded as a flow field. In particular, the flow field together with the ion-selective separator or with the GDL forms the cathode or the anode space, respectively. Preferably, the flow field includes a plurality of ducts and/or a plurality of duct sections, while the separator plate, the GDL and the ion-selective separator by the formation of the plurality of ducts together form a flow field for the fuel B (anode space) or the oxidizing agent O (cathode space). Preferably, a substantially rectangular base surface is provided in the separator, which forms the flow field. However, other base surface geometries are also contemplated. Preferably, the multiple ducts or duct sections have the same general flow direction S. Preferably, the multiple ducts or duct sections extend from an inlet region E of the flow field to an outlet region of the flow field. Preferably, the inlet region E is arranged on one side of the base surface and the outlet region on an opposite side of the base surface. Thus, preferably a meandering course of the ducts is not provided in the flow field.

The at least one duct or at least one duct section may in each case have a duct inlet E through which the gas flows into the duct. For this, the duct inlet E may be fluidically joined to a predistributing structure V, which may likewise be formed in the separator plate.

At least one first duct section converging in the flow direction S and at least one first duct section diverging in the flow direction S are formed in the flow field, preferably in the at least one duct. The flow direction S in this case is the aforementioned overarching flow direction S of the gas in the flow field, i.e., for a rectangular flow field, preferably from one side to the opposite side. In other words, the flow direction S is the longitudinal direction of the at least one duct or duct section. A convergent duct section in this case is a duct section which tapers in the flow direction S. Thus, the duct cross-section area diminishes downstream. A divergent duct section, however, is a duct section whose cross-section area increases in the flow direction S. Thus, the duct opens up in the flow direction S. Preferably, the first duct sections start at the inlet E. However, this need not be the case in other embodiments.

The convergent duct section lies directly adjacent to the divergent duct section. Thus, these two duct sections lie directly next to one another and in the following are also called duct section pairs. Expediently, the two duct sections run substantially in parallel. In other words, the two duct sections have the same general flow direction S, while slight deviations with respect to the general flow direction S may occur on account of their convergent or divergent duct geometry.

At least one barrier is provided in each case between the convergent duct section and the divergent duct section such that the gas may flow at least partially through the gas diffusion layer in order to pass directly from the convergent duct suction into the divergent duct section. In particular, the barrier extends away from the separator plate and toward the gas diffusion layer, expediently so that the barrier lies against the GDL at least for a portion. Besides this transverse flow, the gas can likewise get from the convergent duct section into the divergent duct section across mixing zones, which are described further below. In other words, a portion could also flow around the upstream and downstream ends. If gas is flowing in the convergent duct section, the pressure slowly increases in the flow direction on account of the diminishing cross-section area. The gas is additionally forced into the GDL by this pressure build-up. It flows across the barrier, the gas being forced through the GDL. Thus, an increased amount of gas arrives at the ion-selective separator and reacts there.

At least one additional convergent duct section and at least one additional divergent duct section are provided downstream of the at least one convergent duct section and/or downstream of the at least one divergent duct section. "Downstream" means in this context that at least a portion of the gas which has flowed through the at least one first convergent duct section and/or the at least one second divergent duct section then flows through the at least one additional convergent duct section and/or the at least one additional divergent duct section. "Downstream" thus means away from the inlet region E in the flow direction S, "upstream", however, means toward the inlet region E against the flow direction S. Thus, "downstream" and "upstream" expediently does not refer to the flow through the GDL across the barriers.

The additional duct sections, i.e., the at least one additional convergent duct section and the at least one additional divergent duct section, are preferably arranged and configured exactly like the first duct sections disclosed herein, but only downstream from the first duct sections.

Expediently, moreover, the at least one additional convergent duct section and the at least one additional divergent duct section are separated from each other by an additional barrier. Preferably, the additional barrier is configured and arranged exactly like the first barrier. In other words, the additional barrier is provided between the additional convergent duct section and the additional divergent duct section such that the gas flows at least partially through the gas diffusion layer in order to pass directly from the additional convergent duct section into the additional divergent duct section.

Between the first duct sections and the additional duct sections, there may be arranged at least one mixing zone, into which at least one of the first duct sections empties.

Expediently, the additional duct sections may begin in the mixing zone. In other words, the mixing zone constitutes an interruption between the first duct sections upstream of the mixing zone and the additional, e.g., the second, duct sections downstream of the mixing zone. Preferably, in each case an additional convergent duct section and an additional divergent duct section depart from a mixing zone. Put yet another way, at least one of the first duct sections divides into two additional duct sections, where one duct section is formed convergent and one duct section is formed divergent. In particular, in this case the distributing structure upstream or downstream of the flow field should not be regarded as a mixing zone. In particular, a mixing within the GDL also should not be regarded as a mixing zone Mz of the separator plate.

The first duct sections disclosed here as well as the additional duct sections are expediently convergent or divergent in the top view looking at the flow field or the separator plate, respectively. In other words, in the top view, the side boundaries of the duct sections run toward each other or away from each other in the flow direction S.

Preferably, the mixing zones are configured to produce turbulence. Any layers next to the ion-selective separator will then mix with layers of the gas flow which are arranged at a distance, for example, close to the bottom of the duct section. Preferably, the flow field in the mixing zones is formed such that at least a portion of the gas flow of the first convergent duct section mixes with at least a portion of the gas flow of the first divergent duct section. Thus, thanks to the mixing zone, a more uniform concentration of oxidizing agent O or fuel B is achieved. Any concentration gradients in duct sections arranged next to each other (duct section pairs) can thus be reduced or prevented.

Preferably, a flow field includes at least one, more preferably at least two and especially preferably at least three mixing zones arranged in a row, being fluidically joined in the flow direction S. Preferably, one of the three mixing zones is laterally set off in the flow direction S.

Expediently, at least one mixing zone can be fluidically connected upstream to two first mixing zones, the first mixing zones being fluidically arranged parallel to each other.

A duct section may have a length in the flow direction S of around 2 cm to around 15 cm, preferably of around 3 cm to around 10 cm, and especially preferably of around 5 cm to around 8 cm. The first convergent or divergent duct sections as well as the additional convergent or divergent duct sections can have a length in the flow direction S which is longer by at least a factor of 3, preferably by at least a factor of 5 or at least by a factor of 10 than the length of the at least one mixing zone in the flow direction S.

The length of the mixing zone Mz is preferably around 0.5 times to around 10 times and especially preferably around 1 times to around 2 times the duct width, especially at the duct inlet E.

The additional convergent duct section may be a second convergent duct section. Moreover, the additional divergent duct section may be a second divergent duct section. The additional barrier may be a second barrier. The second convergent duct section, the second divergent duct section and the second barrier may be set off to the side in a first direction Y relative to the first convergent and divergent duct sections and the first barrier in terms of the flow direction S. Preferably, the first direction Y runs perpendicular or substantially perpendicular to the flow direction S.

The additional convergent duct section may be a third convergent duct section, while the additional divergent duct section may be a third divergent duct section, and the additional barrier may be a third barrier. The third convergent duct section, the third divergent duct section and the third barrier may be set off to the side contrary to the first direction Y relative to the second convergent and divergent duct sections and the second barrier in terms of the flow direction S. Preferably, the third duct sections run collinear to the first duct sections and the third barrier collinear to the first barrier.

The first convergent duct section and/or the first divergent duct section may in each case also be formed by two first barriers arranged at an angle to each other. The additional convergent duct section and/or the additional divergent duct section may in each case is formed by two additional barriers arranged at an angle to each other. Preferably, three first barriers arranged at an angle to each other may form the first convergent duct section and the first divergent duct section. Moreover preferably, three additional barriers arranged at an angle to each other may form the additional convergent duct section and the additional divergent duct section. "At an angle to each other" means that the barriers do not run parallel or collinear to each other. Preferably, the first barriers are arranged in each case at the same height in the duct. Moreover preferably, the additional barriers are also arranged at the same height in the duct.

The first and/or the additional divergent duct section may be open at the upstream end, so that the gas can flow into the divergent duct section. In other words, an inflow opening is provided, through which fresh gas upstream or in the upper part of the divergent duct section can flow into the duct. The convergent duct section is arranged fluidically in parallel with the divergent duct section. Unlike with previously known solutions, not just already "consumed gas" collects in the parallel duct, which has already reacted on the catalyst in passing across the GDL. Moreover, in this way, the oxygen from the duct bottom can be conducted in greater quantity toward the catalyst, which may accomplish a loss-free reaction.

The at least one first barrier may be joined to the at least one additional barrier by a connection piece.

The joined barriers may be arranged, in a top view looking at the separator plate, one behind the other in a direction Y perpendicular to the flow direction S, and with an offset relative to each other in the flow direction S, and the adjacent joined barriers may be arranged partly overlapping in the Y direction, perpendicular to the flow direction S. The at least one duct may preferably be bounded by side duct walls running parallel to each other at least for a portion, preferably for their entire length.

The configuration of the duct geometry by conical ducts with simultaneous multiple interruptions of the structure advantageously brings about a better mixing of the flows. Thanks to the conical ducts (narrowing/widening of the ducts), the gas is forced across the webs, i.e., across the contact surface of the bipolar plate to the GDL. This increases the oxygen concentration at the ion-permeable separator and at the catalyst surface of the ion-permeable separator. The repeated narrowing and widening of the duct further increases the concentration of oxidizing agent O and fuel B.

On the whole, the efficiency is boosted, especially the current strength of the fuel cell. Advantageously, the required air flow and/or the required delivery pressure can be less. Thus, a compressor with less power can be used if desired. A smaller compressor reduces costs, weight, and design space and boosts the overall efficiency.

The technology disclosed here preferably entails the following advantages:
- chemical reaction in the fuel cell thanks to a better mixing of the gas and more uniform distribution of the gases in the flow field with smaller concentration gradients and an increased oxidizing agent concentration in the catalyst layer;
- the thermal and electrochemical effects of blocked duct sections can be reduced;
- blockages are more easily sucked out and/or forced out;
- better cold start behavior, since relatively fewer blockages are present in the flow field;
- less space requirement and less overall weight;
- relatively broad barriers enable relatively slight voltage losses at the transition to the GDL;
- better rigidity of the separator plate;
- less air and pressure requirement allows the use of a smaller and thus more favorable compressor;
- easy or easier distribution of the gas of a gas-conducting duct section of the flow field among adjacent duct sections; and/or
- higher overall efficiency of the fuel cell system.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
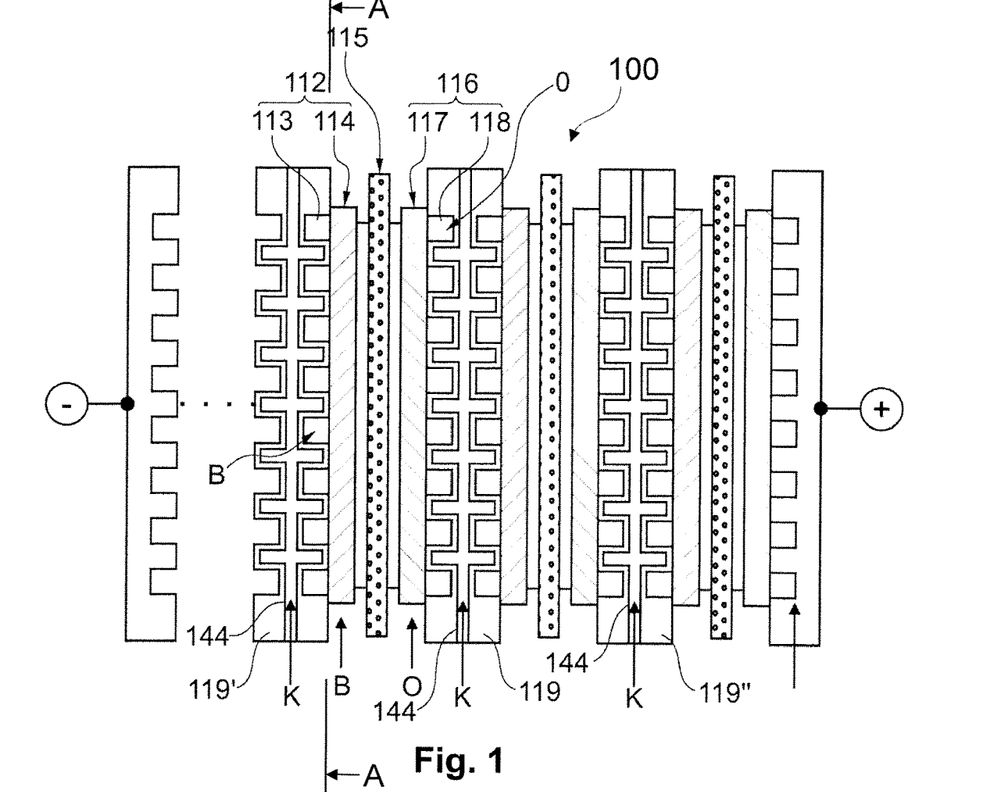
FIG. 1 is a schematic view of a fuel cell stack with a plurality of fuel cells.

FIG. 1 shows an enlarged representation of a fuel cell stack with a plurality of adjacent fuel cells 100. Two adjacent separator plates 119, 119', 119" in each case bound off a fuel cell 100. In the separator plates 119, 119', 119", there are arranged in each case coolant flow pathways 144, through which coolant K flows. It is likewise contemplated to have separator plates with no coolant flow. The gas-conducting duct 113 of the separator plate 119' as well as the adjacent space with the gas diffusion layer 114 form here the anode space 112, which is bounded by the separator plate 119' and the polymer electrolyte membrane 115. In this anode space 112, the fuel cell 100 or the fuel cell stack conveys fuel gas B, such as hydrogen. The gas-conducting duct 118 together with the gas diffusion layer 117 forms the cathode space 116, through which the oxidizing agent O flows. The fuel cell stack illustrated here is bounded at the side by end plates, not further explained here.

Figure 2:
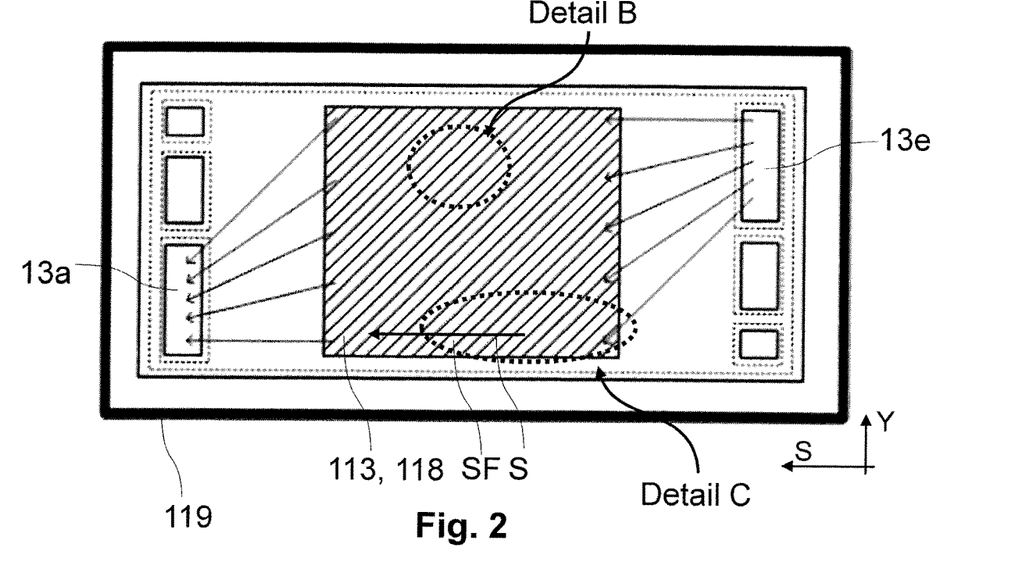
FIG. 2 is a schematic top view of a separator along line A-A of FIG. 1.

FIG. 2 shows a schematic top view along line A-A of FIG. 1. The three media ducts for oxidizing agent O, fuel B, and coolant Kue are arranged here on two opposite sides. However, other configurations are also contemplated. The flow field is supplied with gas through the media port 13e. The gas may be air, for example, which acts as oxidizing agent O. Moreover, it is also contemplated for the gas to be fuel gas B. In the following, we shall speak of a gas in general.

At the right side, there is designated by arrows a distribution structure V (cf. FIG. 3), which distributes the gas over the flow field SF. At the left side, there is designated once again by arrows the structure which collects the gas before the gas leaves the fuel cell through the media outlet 13a at the left side. Not shown more closely in FIG. 2 is the precise course of the ducts 113, 118. A separator plate 119 is shown here, having both anode ducts 113 and cathode ducts 118. Of course, only one of these ducts could be provided instead.

Figure 3:
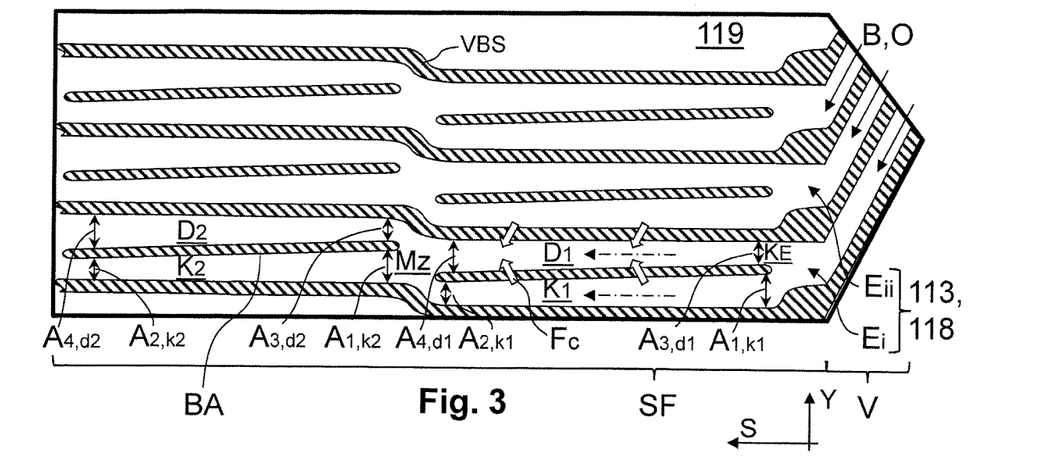
FIG. 3 is a schematic top view of part of a separator.

FIG. 3 shows, greatly simplified, part of a design of the separator plate 119. A distribution structure V is shown, which distributes the gas among several duct inlets Ei, Eii of the plurality of ducts i, ii. The distribution structure V is adjacent to the flow field SF. In the flow field SF, the electrochemical reaction of the fuel cell takes place, which is responsible for the electric current provided by the fuel cell. The flow field SF as well as the ducts i, ii are only represented partly here. Their left edge is cut off. In the following, only the lowermost duct i shall be described more closely. Preferably, the other ducts ii, etc., of the separator plate 119 shown here are constructed exactly the same as the duct i. Preferably, the duct i extends from the distribution structure V at the inlet 13e to the collector structure at the outlet 13a of the separator plate 119. The first convergent duct section K1 is formed parallel to the first divergent duct section D1. The divergent duct section D1 and the additional divergent duct section D2 disclosed here have an opening at the upstream end KE or immediately adjacent to it, through which the gas can flow into the divergent duct D1 or D2. The opening, for example, has a cross-section area A3,d1 or A3,d2 which is preferably smaller than the upstream opening of the first convergent duct section K1 or the additional divergent duct section D2, respectively. Preferably, the cross-section area A1,k1 or A1,k2 of the upstream opening of the first convergent duct section K1 or the additional convergent duct section K2 is at least around 10%, further preferably at least around 50%, and especially preferably at least around 100% larger than the cross-section area A3,d1 or A3,d2 of the upstream opening of the first divergent duct section D1 or the additional divergent duct section D2, respectively.

The convergent duct sections K1, K2 are separated by barriers BA,1, BA,2 from the divergent duct sections D1, D2. The barriers BA,1, BA,2 are formed here as elongated webs. Preferably, both the barriers BA,1, BA,2 and the duct walls lie against the GDL 114, 117 (cf. FIG. 1), not shown here.

Due to the pressure in the convergent duct section K1, K2, which increases on account of the duct cross section gradually narrowing toward the exit from the duct section, a flow across the barriers BA,1, BA,2 is accomplished, which is represented by the arrow Fc. At the same time, a suction effect is preferably produced in the divergent ducts D1, D2, promoting the flow across the webs. The cross-section ratio of the outlet cross-sections A4,d1, A4,d2 of the divergent duct sections D1, D2 to the outlet cross-sections A2,k1, A2,k2 of the duct sections is preferably the exact opposite of the corresponding inlets of the ducts. "Fresh gas" flows through both first duct sections. Moreover, a mixing flow is established in both ducts.

The mixing zone Mz here separates the first duct sections K1, D1 from the additional duct sections K2, D2, which could also be called the second duct sections here.

Preferably, the additional duct sections K2, D2 are arranged at an offset from the first duct sections K1, D1 in relation to the flow direction S. Likewise, the additional barrier BA,2 is arranged at an offset to the first barrier BA,1.

Additional duct sections (e.g., K3, D3, not shown) situated further downstream are in turn arranged at an offset from the additional duct sections K2, D2 shown here.

Figure 4:
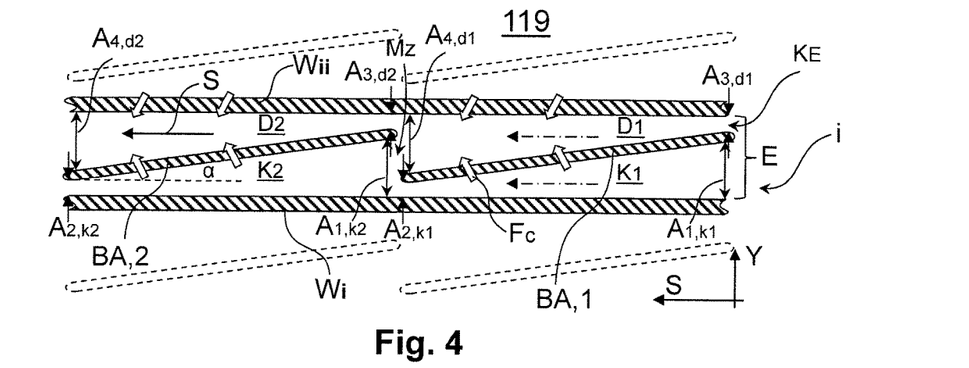
FIGS. 4 and 5 are schematic top views of detail B of FIG. 2.

FIG. 4 shows an enlarged view of detail B of FIG. 2 in one embodiment. The construction of the duct substantially corresponds to that of the duct i of FIG. 3. Therefore, only the differences shall be explained below. The duct walls Wi, Wii in FIG. 4 are formed parallel to each other. They run in a straight line. The additional duct sections D2, K2 are not set off laterally in the Y direction from the first duct sections D1, K1 in relation to the flow direction S. Instead, the first convergent duct section K1 runs substantially collinear to the additional convergent duct section K2. Likewise, the first divergent duct section D1 runs substantially collinear to the additional divergent duct section D2. Not shown more closely are the ducts situated in each case adjacent to the duct i (indicated by broken lines). Preferably, the duct walls Wi, Wii shown constitute at the same time the duct walls of the adjacent ducts (not shown).

Figure 5:
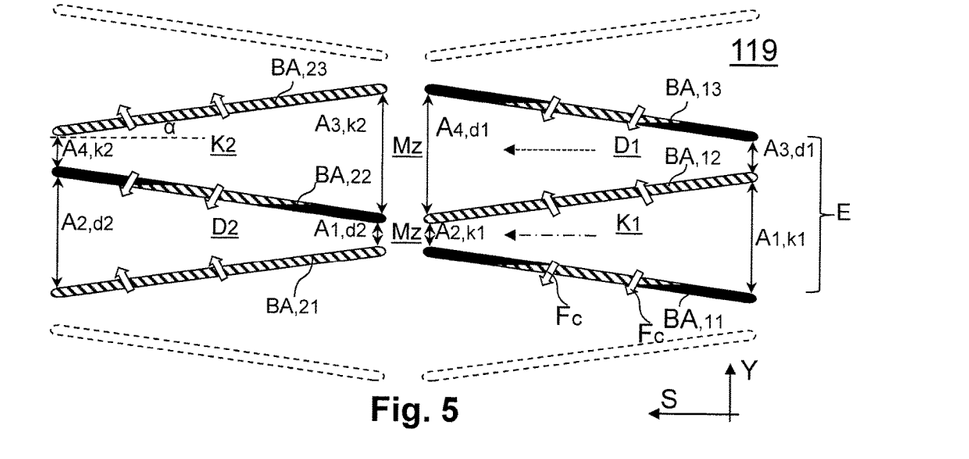

FIG. 5 is another enlarged view of detail B of FIG. 2 in one embodiment. Three first barriers BA,11, BA,12, BA,13 are arranged at the same height in terms of the flow direction S. Two adjacent barriers of the three first barriers form a duct section in each case. The barriers arranged adjacent to each other run at an angle to each other and likewise run at an angle in regard to the flow direction S, especially at an angle +/−α to the flow direction S. For example, the first barriers BA,11, BA,12 form the first convergent duct section K1. The first barriers BA,12 and BA,13, however, form the first divergent duct section Dl. The barriers BA,13 and BA,11 may expediently be formed parallel to each other. The same is true of the additional barriers, i.e., the additional barriers BA,22, BA,23 form the additional convergent duct section K2 and the additional barriers BA,21, BA,22 form the additional divergent duct section D2. Between the first duct sections and the additional duct sections is arranged once again a mixing zone Mz. In this configuration, preferably no duct walls need be provided. Preferably, in particular, no continuous duct walls are provided. Preferably, the duct sections and/or the mixing zone are formed with the same length as the aforementioned examples of FIGS. 2 and 3. In this embodiment as well, there is an advantageous cross flow Fc across the barriers and through the GDL.

Figure 6:
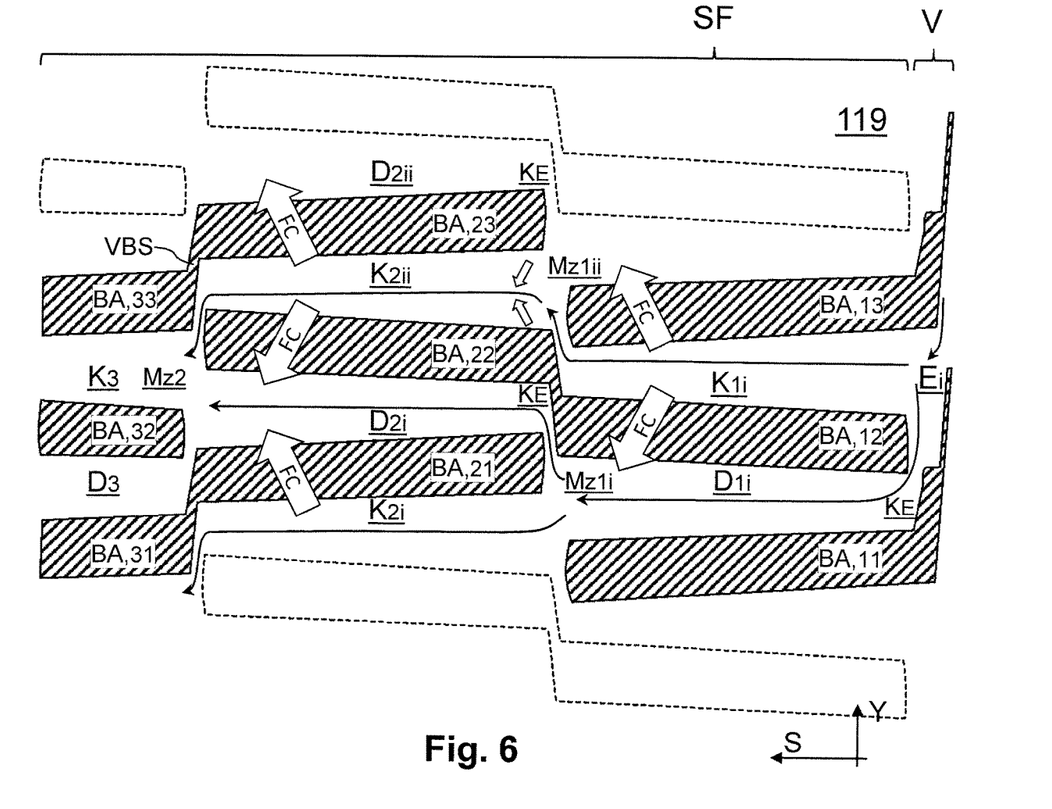
FIGS. 6 and 7 are schematic top views of detail C of FIG. 2.

FIG. 6 shows an enlarged detail view C of FIG. 2 in one embodiment. In the embodiment depicted here, the barrier BA,12 which separates the first convergent duct section K1$i$ from the first divergent duct section D1$i$ is connected by a connection piece VBS. The two barriers BA,12, BA,22 have the same height as the connection piece VBS and in the assembled state lie against the GDL. The first barrier BA,11 is arranged with a lateral offset in the Y direction from the additional second barrier BA,22. The other first barriers BA,11, BA,13, which together with the barrier BA,12 form the first duct sections K1$i$, D1$i$, are joined here as a single piece to the distribution port V and the inlet Ei. As in the previous figures, there is a cross flow Fc through the GDL. Directly at the inlet Ei, the incoming gas is distributed among the first duct sections K1$i$, D1$i$. At the downstream end of the first divergent duct section D1$i$ is located the first mixing zone Mz1$i$, in which the gas from the inlet Ei is mixed with gas from the neighboring branch, shown by broken lines. The gas then goes through the opening at the end KE of the second divergent duct section D2$i$ partly into the second divergent duct section D2$i$. The other part flows from the first mixing zone Mz1$i$ into the second convergent duct section K2$i$. From the first convergent duct section K1$i$, the gas from the first inlet Ei flows into another first mixing zone Mz1$ii$, in which gas from the first inlet Ei mixes with gas from another neighboring branch which is connected to the inlet Eii. From the other first mixing zone Mz1$ii$, a portion of the gas mixture of the inlets Ei, Eii then flows into the second convergent duct K2$ii$.

At the downstream end of the second divergent duct section D2$i$ is located the second mixing zone Mz2$i$. Besides the second divergent duct section D2$i$, the second convergent duct K2$ii$ also empties in this second mixing zone Mz2$i$. This second mixing zone Mz2$i$ is thus supplied from the first gas inlet Ei and the other gas inlet Eii. Thus, there is a blending of the gas in the Y direction perpendicular to the general flow direction S.

The second mixing zone Mz2 is fluidically joined upstream to two first mixing zones, namely, the first mixing zone Mz1$i$ fluidically joined to the gas inlet Ei and the other first mixing zone Mz1$ii$ fluidically joined to the other gas inlet Eii. The first mixing zones Mz1$i$, Mz1$ii$ are thus arranged fluidically in parallel with each other. Expediently, these first mixing zones Mz1$i$, Mz1$ii$ which are arranged fluidically in parallel with each other are also arranged adjacent to each other, with no further mixing zone lying between them. "Fluidically joined" in this context means not the indirect flow through the GDL, but instead the direct connection of the corresponding duct sections, which are formed as indentations in the separator plate.

Figure 7:
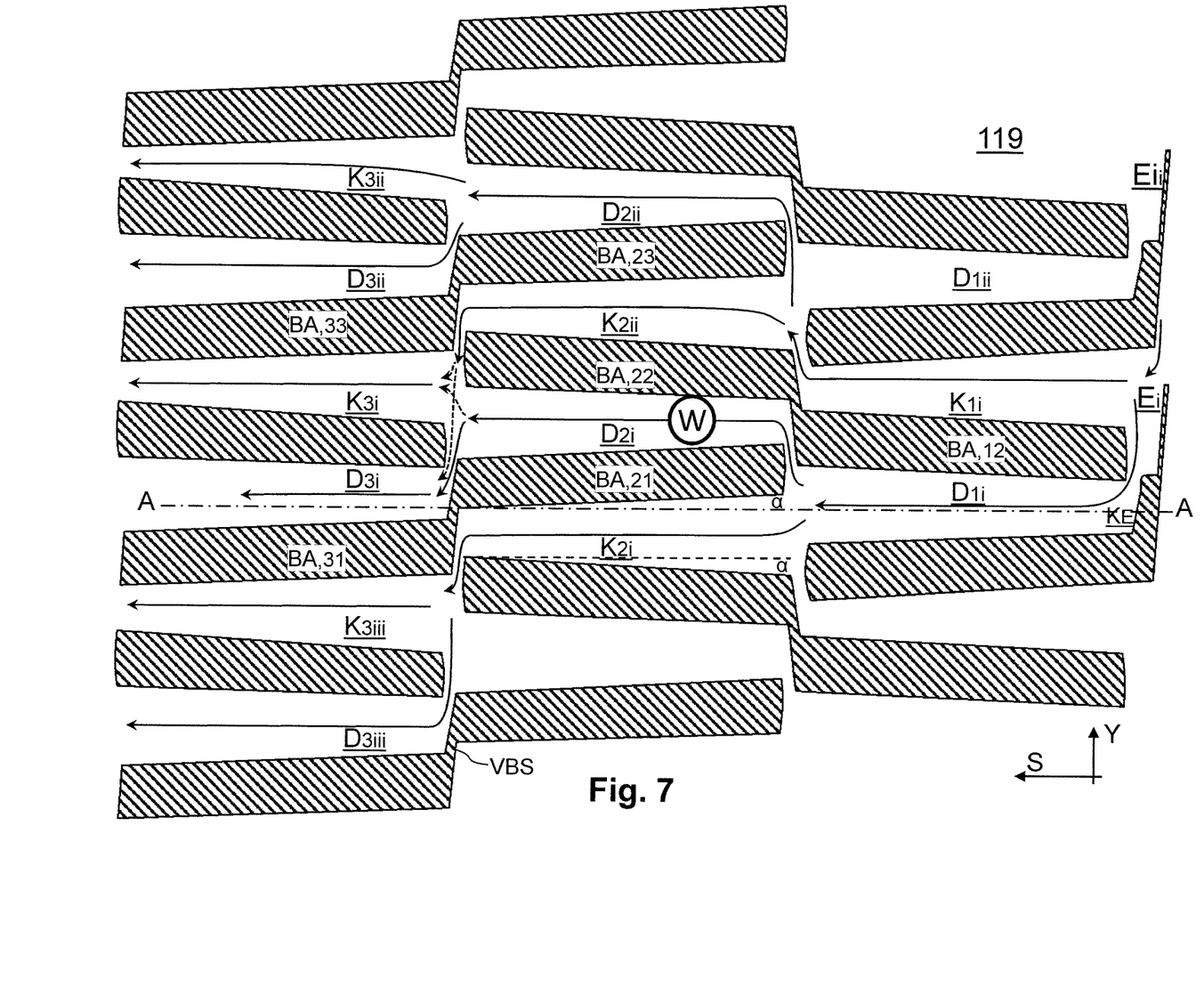

FIG. 7 likewise shows detail C of an embodiment of FIG. 2, but in a larger cutout view. The sample embodiment therefore corresponds to the example of FIG. 6. Several designations are therefore omitted for simplicity. The axis A-A is a comparison axis, which shows that the first divergent duct D1$i$ and the third divergent duct section D3$i$ are not arranged at an offset from each other in the Y direction downstream of the second divergent duct section D2$i$. The second divergent duct section D2$i$, however, is arranged with a lateral offset in regard to the general flow direction S. In other words, the third duct sections K3$i$, D3$i$ and the third barrier BA,3 are set off to the side contrary to the first direction Y relative to the second convergent and divergent duct sections K2, D2 and the second barrier BA,2 in terms of the flow direction S.

The flow field and the duct sections are formed here by joined barriers or barrier groups BA12-BA22, BA23-BA33 and BA21-BA31. Preferably, adjacent joined barriers are arranged inter-penetrating.

Joined barriers are directly joined to each other for example by a connection piece VBS (not shown here). The connection piece VBS itself in this case may also function as a barrier to the gas.

For example, the barriers BA12-BA22, BA23-BA33 and BA21-BA31 are joined barriers. In the top view of the separator plate 119, as shown in FIGS. 6 and 7, the adjacent joined barriers are arranged, for example, at least partly one behind the other in the Y direction perpendicular to the flow direction S. In the flow direction S, two adjacent and joined barriers are arranged at an offset from each other. Joined barriers which are arranged adjacent to each other may be arranged partly overlapping in the Y direction perpendicular to the flow direction S. Adjacent joined barriers BA12-BA22, BA23-BA33 and BA21-BA31 are in this case two separate barrier groups, each group having two barriers, which are joined by the connection piece VBS. The two barrier groups together generally form a duct section.

FIG. 7 indicates by arrows the duct sections into which the gas from the inlet Ei can branch out. At the inlet Ei, it first branches out among the first duct sections D1$i$, K1$i$. After this, it branches further among the second duct sections D2*i*, K2*i*; D2*ii*, K2*ii*. In the third stage, it then branches out already among six duct sections D3*i*, K3*i*; D3*ii*, K3*ii*; D3*iii*, K3*iii*. Now, if a blockage W occurs in a duct section, for example a drop of condensate W or a piece of ice, this blockage W can be relatively well compensated for thanks to the good branching. As compared to previously known solutions, the gas is also relatively well distributed in the event of such a blockage. Thermal damage can be preferably reduced and the impairment of the electrochemical reaction can be moderated. The gas present downstream of the blockage W can flow away via the ducts K3*i* and D3*i*. Thus, a pressure gradient is formed across the blockage W, which is relatively large. This pressure gradient between the regions upstream and downstream of the blockage W may have the effect that the blockage W is broken up and delivered out from the flow field. Thus, a relatively good cold start and frost start behavior is established. The individual barriers may also be designed relatively broad. The voltage losses between the barriers and the GDL are relatively slight, thanks to the relatively broad barriers.

The cross-section ratio of the outlet cross-sections of the duct sections among each other and the inlet cross-sections of the duct sections among each other is in FIGS. 4 to 7 preferably the same as in the previously discussed examples of FIGS. 2 and 3.

Insofar as the remarks presented here pertain to one duct, the plural thereof (i.e., several ducts of identical construction) should also be disclosed at the same time. For example, the technology disclosed here preferably includes several pairs of convergent and divergent duct sections arranged adjacent to each other, such as more than 20 pairs. Preferably, pairs of first, second and third pairs are provided, the first pairs being situated upstream of the second pairs, and these second pairs in turn upstream of the third pairs. On the whole, preferably more than 30 pairs are provided. The pairs in turn are preferably each separated from one another by mixing zones Mz. With the technology disclosed here, it is possible to divide up the oxidizing agent O or the fuel B of one duct among various adjacent ducts, especially such that, starting from a duct inlet E at the upstream end of the flow field, the oxidizing agent O or the fuel B fans out and is distributed in the flow direction S.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell, comprising:
an ion-selective separator;
a gas diffusion layer situated adjacent to the separator; and
a separator plate which, together with the gas diffusion layer, forms a gas-conducting flow field,
wherein
a plurality of ducts extend between a media inlet duct and a media exhaust duct,
at least one of the plurality of ducts has an upstream portion and a downstream portion having a constant width transverse to a gas flow direction of a gas flow,
the at least one duct of the plurality of ducts includes a first barrier configured to divide at least a section of the upstream portion of the at least one duct into a first convergent duct section and a first divergent duct section laterally adjacent to one another relative to the gas flow direction, the first barrier being arranged between parallel side walls of the upstream portion, and
at least one additional barrier configured to divide at least a section of the downstream portion of the at least one duct into at least one additional convergent duct section and at least one additional divergent duct section laterally adjacent to one another relative to the gas flow direction, the at least one additional barrier being arranged between parallel side walls of the downstream portion, and
the first barrier is arranged such that at least a portion of the gas flow along the first barrier passes from the first convergent duct section through the gas diffusion layer into the first divergent duct section at the first barrier,
the at least one additional barrier is arranged such that at least a portion of the gas flow along the at least one additional barrier passes from the additional convergent duct section through the gas diffusion layer into the additional divergent duct section at the at least one additional barrier,
between the first barrier and the at least one additional barrier there is arranged at least one mixing zone into which at least one of the first convergent section and the first divergent duct section empty and from which the at least one additional convergent duct section and at least one additional divergent duct section receive the gas flow.

2. The fuel cell according to claim 1, wherein at least one of the first divergent duct section and the at least one additional divergent duct section are/is open at its upstream end, such that the gas can flow into the first divergent duct section or the at least one divergent duct section.

3. The fuel cell according to claim 1, wherein
the at least one additional convergent duct section includes a second convergent duct section, while the at least one additional divergent duct section includes a second divergent duct section, and the at least one additional barrier includes a second barrier, and
the second convergent duct section, the second divergent duct section, and the second barrier are set off to a side in a first direction relative to the first convergent and divergent duct sections and the first barrier in terms of a flow direction of the gas.

4. The fuel cell according to claim 2, wherein
the at least one additional convergent duct section includes a second convergent duct section, while the at least one additional divergent duct section includes a second divergent duct section, and the at least one additional barrier includes a second barrier, and
the second convergent duct section, the second divergent duct section and the second barrier are set off to a side in a first direction relative to the first convergent and divergent duct sections and the first barrier in terms of a flow direction of the gas.

5. The fuel cell according to claim 4, wherein
the at least one additional convergent duct section includes a third convergent duct section, while the at least one additional divergent duct section includes a third divergent duct section, and the at least one additional barrier includes a third barrier, and
the third convergent duct section, the third divergent duct section and the third barrier are set off to a side contrary to the first direction relative to the second convergent and divergent duct sections and the second barrier in terms of the flow direction.

6. The fuel cell according to claim 1, wherein the at least one mixing zone includes a mixing zone fluidically connected to two upstream first mixing zones, the two first mixing zones being fluidically arranged parallel to each other.

7. The fuel cell according to claim 5, wherein between the second convergent and divergent duct sections and the third convergent and divergent duct sections, there is arranged at least one second mixing zone, into which at least one of the second convergent and divergent duct sections empties, and in which the third convergent and divergent duct sections begin.

8. The fuel cell according to claim 1, wherein at least one of the first convergent duct section and the first divergent duct section as well as at least one of the additional convergent section and the additional divergent duct section have a length in a flow direction of around 2 cm to around 15 cm.

9. The fuel cell according to claim 8, wherein the at least one of the first convergent and divergent duct sections as well as the at least one of the additional convergent and additional divergent duct sections have a length in the flow direction of around 5 cm to around 8 cm.

10. The fuel cell according to claim 6, wherein the at least one of the first convergent and divergent duct sections as well as the at least one of the additional convergent and additional divergent duct sections have a length in a flow direction which is longer at least by a factor of 3 than a length of the at least one mixing zone in the flow direction.

11. The fuel cell according to claim 10, wherein the at least one of the first convergent and divergent duct sections as well as the at least one of the additional convergent and additional divergent duct sections have a length in the flow direction which is longer at least by a factor of 20 than a length of the at least one mixing zone in the flow direction.

12. The fuel cell according to claim 6, wherein the at least one of the first convergent and divergent duct sections as well as the at least one of the additional convergent and additional divergent duct sections are fluidically joined together by the at least one mixing zone such that oxidizing agent or fuel can be distributed in the separator plate among multiple adjacent convergent and/or divergent duct sections.

13. The fuel cell according to claim 11, wherein the at least one of the first convergent and divergent duct sections as well as the at least one of the additional convergent and additional divergent duct sections are fluidically joined together by the at least one mixing zone such that oxidizing agent or fuel can be distributed in the separator plate among multiple adjacent convergent and/or divergent duct sections.

14. The fuel cell according to claim 1, wherein
the first convergent duct section and/or the first divergent duct section is in each case formed by two first barriers arranged at an angle to each other, and/or
the additional convergent duct section and/or the additional divergent duct section is in each case formed by two additional barriers arranged at an angle to each other.

15. The fuel cell according to claim 13, wherein
the first convergent duct section and/or the first divergent duct section is in each case formed by two first barriers arranged at an angle to each other, and/or
the additional convergent duct section and/or the additional divergent duct section is in each case formed by two additional barriers arranged at an angle to each other.

16. The fuel cell according to claim 14, wherein
three first barriers arranged at an angle to each other form the first convergent duct section and the first divergent duct section, and/or
three additional barriers arranged at an angle to each other form the additional convergent duct section and the additional divergent duct section.

17. The fuel cell according to claim 15, wherein
three first barriers arranged at an angle to each other form the first convergent duct section and the first divergent duct section, and/or
three additional barriers arranged at an angle to each other form the additional convergent duct section and the additional divergent duct section.

18. The fuel cell according to claim 1, wherein the first barrier is joined to the at least one additional barrier by a connection piece.

19. The fuel cell according to claim 18, wherein the first barrier joined to the at least one additional barrier is arranged, in a top view looking at the separator plate, partly overlapping with another adjacent joined barrier.

20. The fuel cell according to claim 1, wherein
in each case, the first convergent duct section, the first divergent duct section, the additional convergent duct section and the additional divergent duct section form a duct, and the duct is bounded by side duct walls running parallel to each other at least for a portion.

* * * * *